United States Patent
Yoshida et al.

[11] Patent Number: 6,060,658
[45] Date of Patent: May 9, 2000

[54] POLE HAVING SOLAR CELLS

[75] Inventors: Hitoshi Yoshida; Takashi Fujii, both of Osaka, Japan

[73] Assignees: Showa Pole Co., Ltd., Sakai; Tagawasyouji, Ltd., Himeji, both of Japan

[21] Appl. No.: 08/995,019

[22] Filed: Dec. 19, 1997

[30] Foreign Application Priority Data

Dec. 19, 1996 [JP] Japan .................................. 8-359716

[51] Int. Cl.[7] ................ F21S 9/02; G04C 10/02; H01L 31/042
[52] U.S. Cl. ................ 136/291; 136/243; 136/244; 136/248; 52/173.3; 429/111; 362/183; 362/276; 362/812; 323/906
[58] Field of Search ............................ 136/291, 243, 136/244, 248; 52/173.3; 429/111; 362/183, 276, 812; 323/906

[56] References Cited

U.S. PATENT DOCUMENTS

| | | | |
|---|---|---|---|
| 4,062,371 | 12/1977 | Bolen | 136/291 |
| 4,224,082 | 9/1980 | Jacobson | 136/248 |
| 4,281,369 | 7/1981 | Batte | 136/291 |
| 4,718,185 | 1/1988 | Conlin et al. | 40/442 |
| 4,827,645 | 5/1989 | Stamps, Jr. | 40/567 |
| 5,121,307 | 6/1992 | Moore | 136/291 |

OTHER PUBLICATIONS

Schmid, Jurgen; "Small Power Photovoltaic Systems"; Photovoltaic Solar Energy Conference; Oct. 27–31, 1986, pp. 113–120.

European Search Report for European Patent Application No. 97122566, dated May 19, 1999.

*Primary Examiner*—Alan Diamond
*Attorney, Agent, or Firm*—Armstrong, Westerman, Hattori, McLeland & Naughton

[57] ABSTRACT

A pole incorporating solar cells has a lighting device or like electric device attached thereto, and a required number of solar cell modules arranged approximately vertically on at least one portion of peripheral wall of the main body of the pole. The arrangement of solar cell modules has the function of generating the electric energy to be consumed by the electric device for one day, utilizing solar radiation afforded by at least scattered sunlight selected from scattered sunlight or direct sunlight. A storage device is provided in the pole main body and has a capacity to accumulate therein the electric energy to be consumed by the electric device for one day, and is repeatedly charged and discharged every day.

5 Claims, 14 Drawing Sheets

POLE HAVING SOLAR CELLS

BACKGROUND OF THE INVENTION

1. Field of the Invention

The present invention relates to poles having solar cells and an electric device, such as a street lamp or like lighting device, public sign, electric clock or communications device, attached thereto.

2. Description of the Related Art

Independent power source systems generally in outdoor use for supplying electric energy, for example, to lighting devices for street lamps comprise solar cells which are invariably installed in a south-facing location where sunshine is available and which are attached to the top of a pole as inclined obliquely upward at an angle of about 45 deg with a horizontal plane so as to absorb solar energy most efficiently. The electric energy generated is charged into a storage device with consideration given to the average duration of sunshine per day. The storage device used in this case has a capacity to store an amount of electric energy corresponding to 5 to 30 days to compensate for the days on which sunshine is unavailable since the storage device is not fully chargeable on rainy or cloudy days.

With such conventional outdoor powder source systems, the place where the solar cells are installed is inevitably limited to a south-facing location where sunshine is available, and no consideration is given to compensate for operation in the shade.

The solar cell arrangement is conventionally installed as inclined obliquely upward at an angle of about 45 deg with a horizontal plane and therefore permits deposition, for example, of bird droppings on its surface, failing to charge the storage device. The solar cell arrangement thus inclined further is covered with snow during winter in a cold climate and likely to become incapable of charging the storage device. Additionally, the solar cells need to have a completely water-tight structure to prevent rainwater from penetrating into the cell while the water flows over the inclined surface thereof. Because the solar cells are attached as inclined to the top of the pole, the pole equipped with the cells has a poor balance, is prone to falling down as a result of the wind or an earthquake and remains to be improved in safety.

Furthermore, it has been necessary to use a large storage device having a capacity for storing an amount of electric energy corresponding to 5 to 30 days to compensate for the lack of sunshine. This renders the pole costly and heavy, entailing the problem that the casing provided separately from the main body of the pole for housing the storage device requires an increased space for the installation of the casing.

SUMMARY OF THE INVENTION

An object of the present invention is to provide a pole having solar cells which is free of the foregoing problems.

The present invention provides a pole having solar cells which is a pole having a lighting device or like electric device attached thereto, the pole being characterized in that a required number of solar cell modules are arranged approximately vertically on at least one portion of a peripheral wall of a pole main body, the pole main body being provided with a storage device for accumulating therein electric energy from the solar cell modules so as to supply the electric energy accumulated in the storage device to the electric device.

The solar cell modules have the function of generating electric energy to be consumed by the electric device for one day, and the storage device has a capacity to accumulate the electric energy to be consumed by the electric device for one day.

The solar cell modules have the function of generating the electric energy to be consumed by the electric device for one day, with solar radiation afforded by at least scattered sunlight selected from scattered sunlight or direct sunlight. Accordingly, the electric energy to be consumed by the electric device for one day can be generated not only on a clear day but also on a rainy or cloudy day.

According to the invention, the output to be generated by the solar cell modules is not determined based on the quantity of solar radiation afforded by direct sunlight on the clear day as practiced conventionally but is determined based on the quantity of radiation provided by scattered sunlight on a rainy or cloudy day as selected from the clear day or the rainy or cloudy day.

According to the invention, the solar cell modules are arranged approximately vertically on the peripheral wall of the pole main body, so that the generated output of the modules is about ¼ of the original rated generated output of the modules. Since the generated output is based on the quantity of solar radiation afforded by scattered sunlight on the rainy or cloudy day as stated above, the generated output to be utilized consequently corresponds to several percent of the original rated generated output of the modules.

The solar radiation due to scattered sunlight has a unique nature and is available during sunshine from morning till evening. It is radiant energy available evenly for a long period of time during the daytime regardless of the weather even on a rainy or cloudy day or in the shade on a clear day, and irrespective of whether the solar cell system faces east, west, south or north, i.e., regardless of the orientation of the system installed.

In a sunny place (on a south-facing surface) on the clear day, direct sunlight affords a very large quantity of solar energy, so that the arrangement of solar cells will generate within a short period of time an amount of electric energy required for one day.

The solar cell module is in the form of a panel or film. A required number of solar cell modules are arranged approximately vertically along at least one portion of the peripheral wall of the pole main body. At least one solar cell module is used. When the generated output of the single solar cell module is smaller than the amount of electric energy to be consumed by the electric device for one day, an increased number of solar cell modules are used so as to obtain the required amount of electric energy.

The storage device performs the function of accumulating the electric energy from the solar cell modules. Examples of useful storage devices include an electric double layer capacitor, nickel-cadmium battery and lead battery.

The storage device is repeatedly charged and discharged every day, accumulating the amount of electric energy generated by the solar cell modules and to be consumed by the electric device for one day and supplying the energy to the electric device. The storage device is therefore preferably adapted to undergo an increased number of charge-discharge cycles. Desirable as such a device is the electric double layer capacitor. Further when the storage device is set at an amount of electric energy for charge and discharge which amount is considerably smaller than the original capacity thereof, the number of charge-discharge cycles can be greatly increased. The nickel-cadmium battery or lead battery is usable as such a battery.

At the interface between two different layers (solid/liquid) in contact with each other, positive and negative charges are present as spaced apart by a very small distance at opposite sides of the interface. These charges are referred to as an "electric double layer." When voltage is applied to the electric double layer, electricity is stored therein. This principle is utilized for the electric double layer capacitor. A solar cell-device comprising this capacitor and a solar cell in combination therewith is already known as disclosed in Japanese Patent Application No. 324096/1993 (J-A-177683/1995 and U.S. Pat. No. 5,594,313 corresponding thereto).

When the storage device is such an electric double layer capacitor, such electric double layer capacitors are attached to one side of the solar cell module to provide a power source unit, which is disposed approximately vertically on the peripheral wall of the pole main body, with the capacitor side of the unit facing the pole main body.

On the other hand, the pole main body is triangular, square or rectangular, pentagonal, hexagonal, octagonal or otherwise polygonal in cross section, or may have a circular or elliptical cross section. The pole main body is hollow or solid.

When the pole main body is hollow, the storage device is provided inside the body. When the body is solid, the storage device is attached to the outer surface of the body.

The pole main body is provided with an inverter circuit for converting direct current into alternating current and amplifying the frequency to be supplied to the lighting device or like electric device to a predetermined value.

The panellike or filmlike solar cell modules are arranged approximately vertically on at least one portion of the peripheral wall of the pole main body. For example, when the pole main body is polygonal in cross section, the modules are provided along at least one of the many sides of the body. The modules are attached to the peripheral wall of the body approximately over the entire length thereof or to the upper half of the wall. Alternatively, the solar cell modules are attached to an intermediate portion of the peripheral wall of the main body except the upper and lower end portions thereof.

To obtain the greatest possible generated output in a narrow space, it is desirable to attach the solar cell modules to the periphery wall of the main body over the entire area thereof.

While the modules have the function of generating an amount of electric energy to be consumed by the electric device for one day, with solar radiation afforded by scattered sunlight selected from scattered sunlight or direct sunlight, the energy is preferably produced by solar radiation provided by both scattered sunlight and direct sunlight.

When the solar cell modules are provided over the entire area of peripheral wall of the pole main body, the module arrangement is exposed to solar rays including solar rays from the south during culmination at noon, those from the east in the morning and those from the west in the afternoon. As a result, sunshine during the daytime can be effectively utilized to obtain solar energy efficiently.

In the case where the pole main body is, for example, triangular in cross section, the solar cell modules are attached to two or all of the three sides of the body. When the body has a square to rectangular cross section, the modules are attached to two to all of the four sides of the body. When the body has a pentagonal cross section, the modules are attached to from three to all of the five sides of the body. When the body has a hexagonal cross section, the modules are attached to from three to all of the six sides of the body. When the body has an octagonal cross section, the modules are attached to from three to all of the eight sides of the body.

In the case where the pole main body has such a polygonal cross section, it is desired to install the pole in such an orientation that one of the corners of the pole main body faces toward the direction of culmination of the sun since sunshine during the daytime can then be utilized effectively.

In the case where the pole main body has a circular or elliptical cross section, a flat surface may be provided on both the front and rear sides or left and right sides of the body for the installation of the modules.

Examples of electric devices for use on the solar cell-incorporating pole of the invention are street lamp lighting devices, public signs, electric clocks and communications devices.

With public signs, characters, symbol or like pasigraphy is illuminated with fluorescent lamps, electrodeless xenon fluorescent lamps or like lighting devices, or the pasigraphy itself is caused to luminesce with light-emitting diodes or like devices to give an improved display or aesthetic effect. The electric energy generated by the solar cell modules and accumulated in the storage device is supplied to such lighting devices.

The pole of the present invention is not limited in the location of installation and therefore easy to install, does not require a large space, is adjustable in the amount of electric energy to be obtained by suitably varying the number of modules to be used or the surface area of the module, hence great convenience.

The solar cell modules have the function of generating the electric energy to be consumed by the electric device for one day, with solar radiation afforded by at least scattered sunlight selected from scattered sunlight or direct sunlight. Accordingly, the electric energy to be consumed by the electric device for one day can be generated not only on a clear day but also on a rainy or cloudy day.

According to the invention, the output to be generated by the solar cell modules is not determined based on the quantity of solar radiation afforded by direct sunlight on the clear day as practiced conventionally but is determined, based on the,quantity of radiation provided by scattered sunlight on the rainy or cloudy day as selected from the clear day or the rainy or cloudy day. The solar radiation due to scattered sunlight has a unique nature and is available during sunshine from morning till evening. It is radiant energy available evenly for a long period of time during the daytime regardless of the weather even on a rainy or cloudy day or in the shade on a clear day, and irrespective of whether the solar cell system faces east, west, south or north, i.e., regardless of the orientation of the system installed.

According to the invention, therefore, the solar cell modules are capable of operating even in the shade or on rainy or cloudy days, generating a sufficient amount of electric energy even in the shade or on rainy or cloudy days, hence a very convenient system of all-weather design.

The storage device is repeatedly charged and discharged every day, accumulating the amount of electric energy generated by the solar cell modules and to be consumed by the electric device for one day and supplying the energy to the electric device. The storage device can therefore be compact and small in capacity.

An electric double layer capacitor, nickel-cadmium battery or lead battery is used as such a storage device. Further the storage devices to be used in combination with solar cell modules to provide a power source system are housed inside the pole main body, or the combination of storage devices and modules is attached to the peripheral wall of the main body, whereby the space for the installation of the system can be diminished.

The solar cell modules arranged approximately vertically on the peripheral wall of the pole main body are free of the likelihood of failing to charge the storage devices owing to snow in a cold climate and also free from droppings of birds, are not susceptible to the penetration of rainwater and fully retain water-tightness.

With the modules arranged approximately vertically on the pole main body, the pole has an aesthetic appearance and a good balance despite the provision of the solar cells, is unlikely to fall down owing to the wind or earthquake and therefore assures high safety.

The solar cell modules are mounted on the high pole main body, so that solar energy can be obtained efficiently. When installed at a higher level away from the ground, the modules can be protected from mischief or damage, hence excellent safety.

The present invention will be described below in greater detail with reference to the accompanying drawings.

DESCRIPTION OF THE PREFERRED EMBODIMENTS

Figure 1:
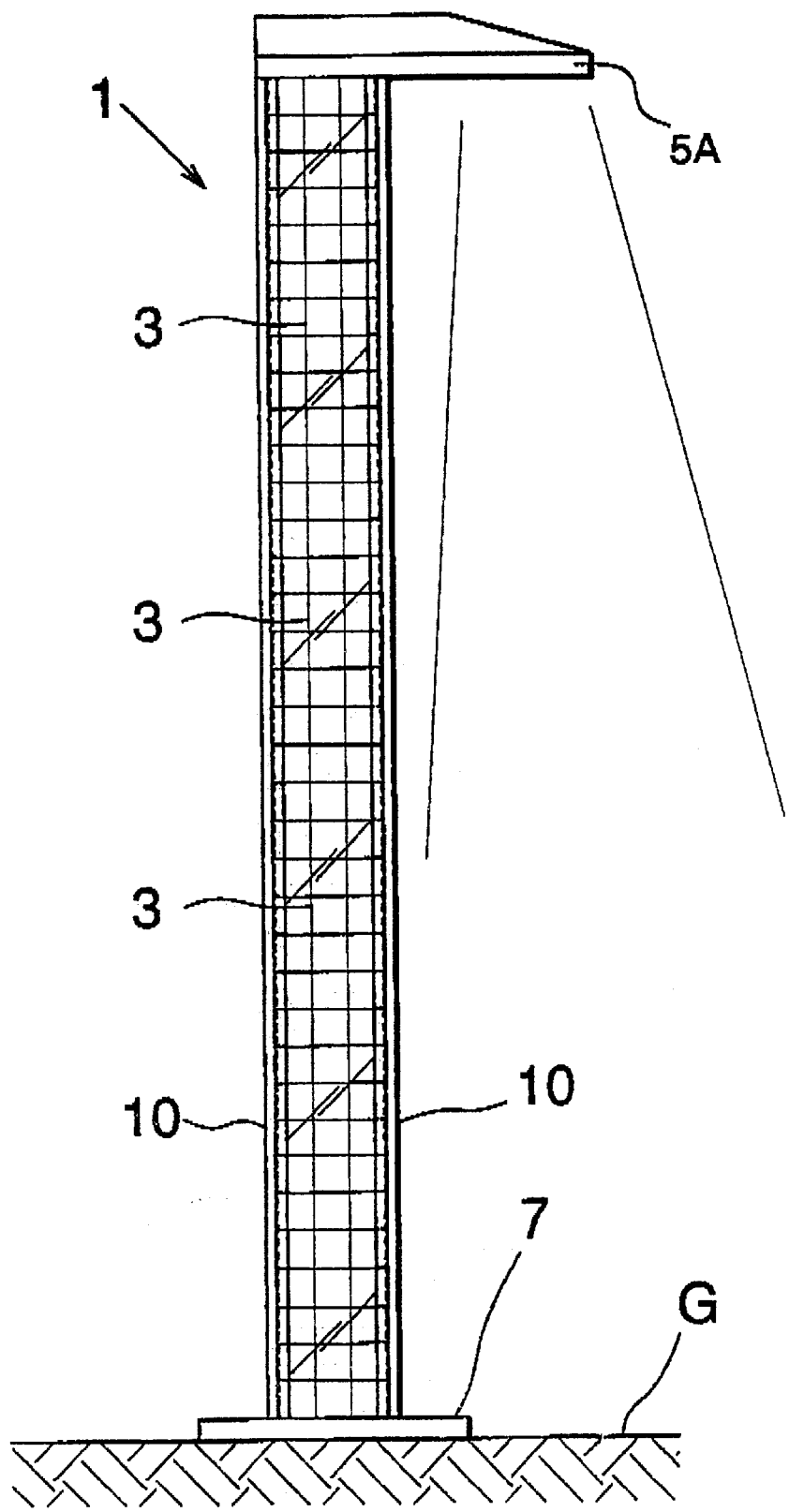
FIG. 1 is a schematic side elevation showing a first embodiment of the invention, i.e., a pole having solar cells and useful as a street lamp.

Throughout the drawings, like parts are designated by like reference numerals.

Referring to FIGS. 1 to 5 showing a first embodiment of the present invention, a pole 1 equipped with solar cells has attached thereto an electric device, i.e., a lighting device 5A for use as a street lamp. The pole 1 comprises a main body 2 extending upright from a base 7 on the ground G and having attached to its peripheral wall panellike solar cell modules 3 so as to extend along the wall, with light receiving surfaces of the modules 3 positioned approximately vertically.

The pole main body 2 is made of steel and has a square cross section. The solar cell modules 3 in the form of panels are provided on the approximately vertical wall of the main body 2 on the base 7 over the entire surface of the wall with their light receiving surfaces positioned approximately vertically.

The illustrated solar cell modules 3 are attached to the four sides of the pole main body 2. Four modules 3 are positioned one above another on each side of the main body 2.

Corner members 10 of extruded aluminum material are attached to the four corners of the pole main body 2, and the modules 3 are held in place by the corner members 10.

Figure 2:
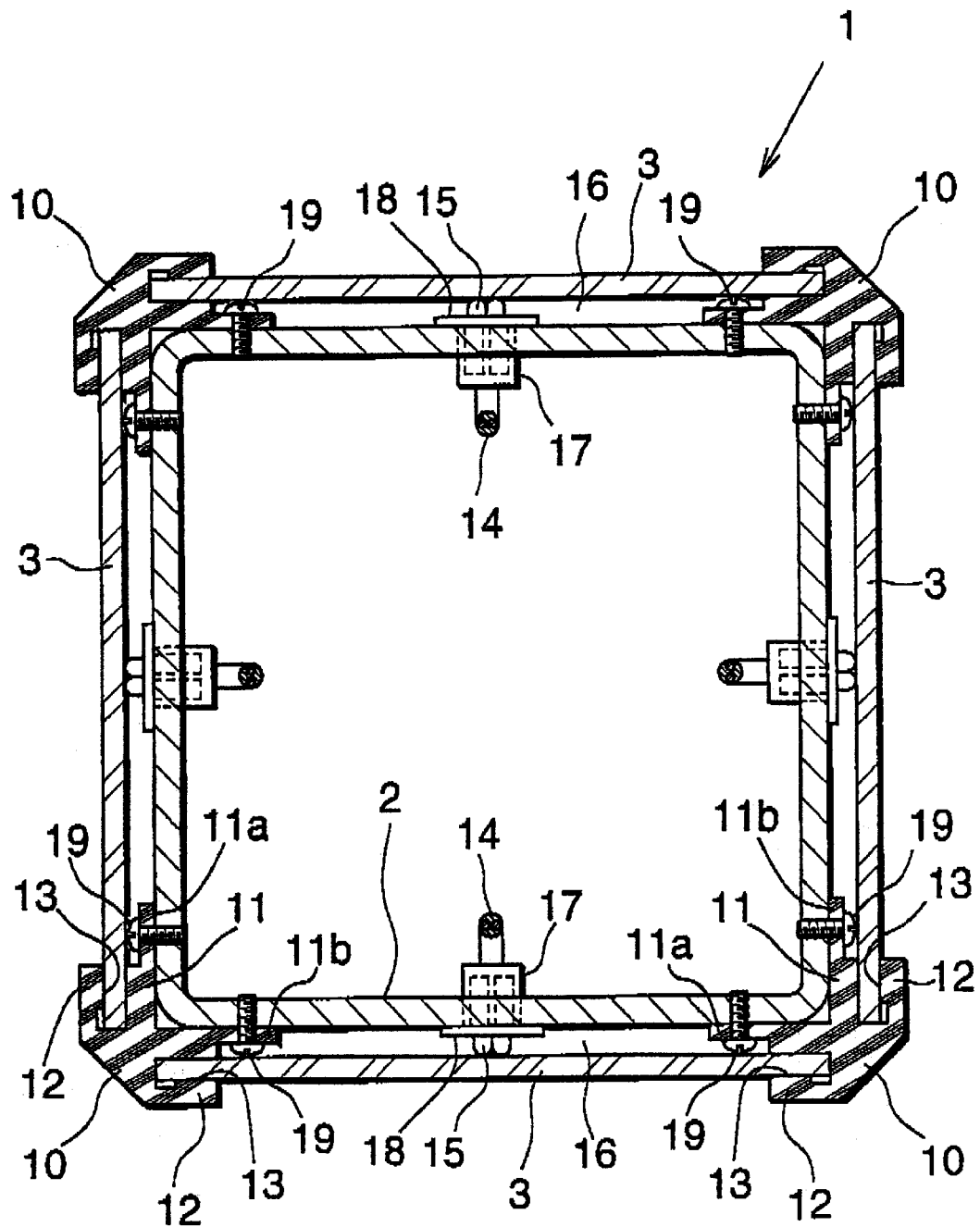
FIG. 2 is an enlarged view in horizontal section of the same.

As shown in detail in FIG. 2, each of the corner members 10 comprises a mount 11 approximately L-shaped in cross section and having opposite side edge portions 11a, 11b, which are fastened to the pole main body 2 with screws 19, 19. The mount 11 is formed with extensions 12, 12 opposed thereto and with a recess 13 provided between the mount 11 and each extension 12. An edge portion of the module 3 is inserted in the recess 13.

A storage device 4 is provided inside the pole main body 2 (see FIG. 3) for collecting electric energy generated by the modules 3. For example, the storage device 4 is provided singly for the four modules 3 on the four sides of the pole main body in each of the four stages, or for all the modules 3. However, the number of storage devices 4 is not limited.

Figure 3:
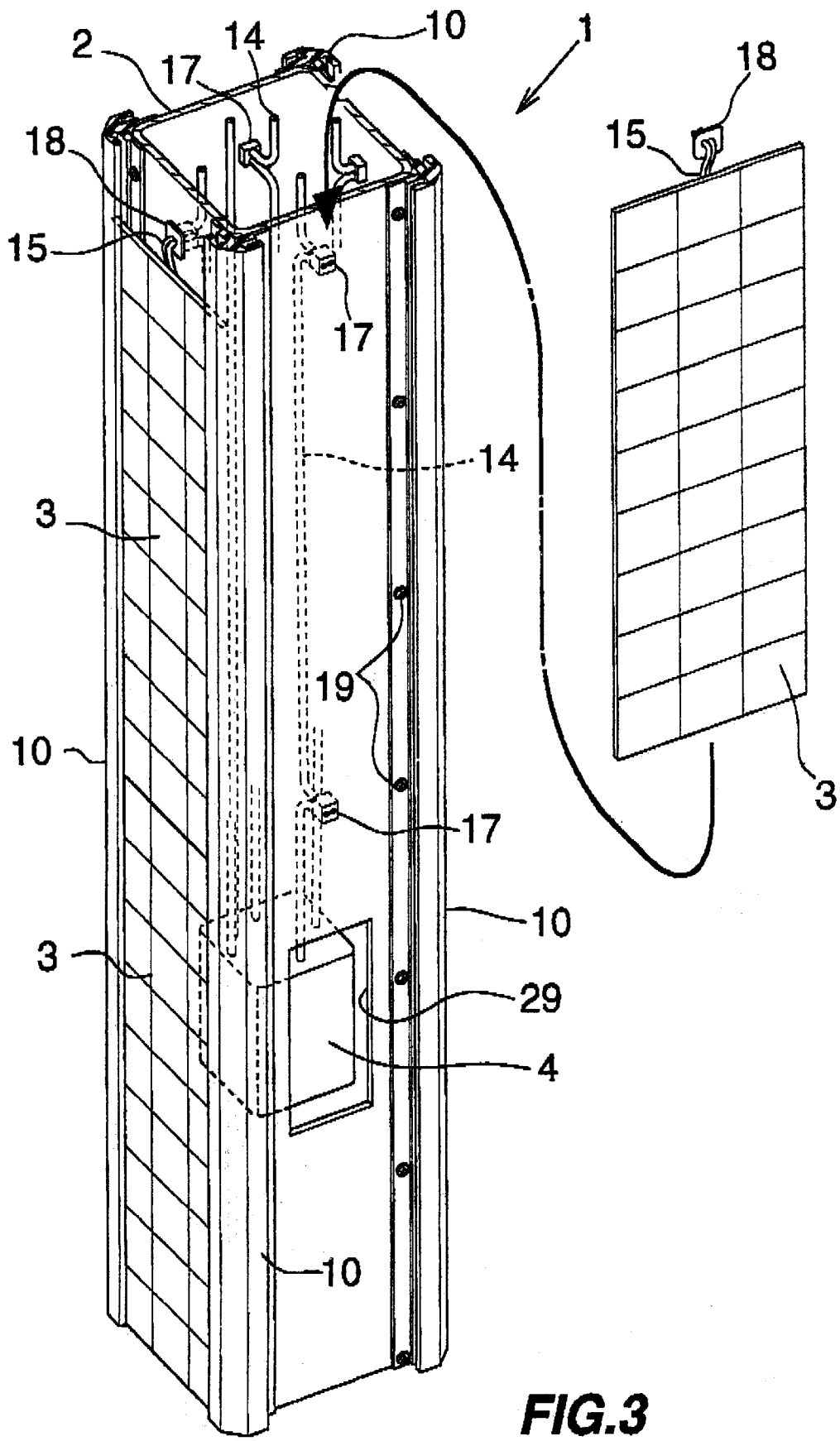
FIG. 3 is an enlarged fragmentary perspective view of the same to show solar cell modules as attached to the peripheral wall of a pole main body.

When housed inside the pole main body 2 in this way, the storage device 4 is easy to install and can be protected by the main body 2. As shown in FIG. 3, one of the side walls of the pole main body 2 is formed with an opening 29 for inspecting the storage device 4. An inverter circuit (not shown) is provided inside the pole main body 2 along with the storage device 4 for converting the direct current from the storage device 4 into an alternating current and amplifying the frequency to be applied to the lighting device 5A to a predetermined value.

Examples of useful storage devices are an electric double layer capacitor, nickel-cadmium battery, lead battery, etc., among which the electric double layer capacitor is preferred because the device 4 can then be given a prolonged life.

Figure 4:
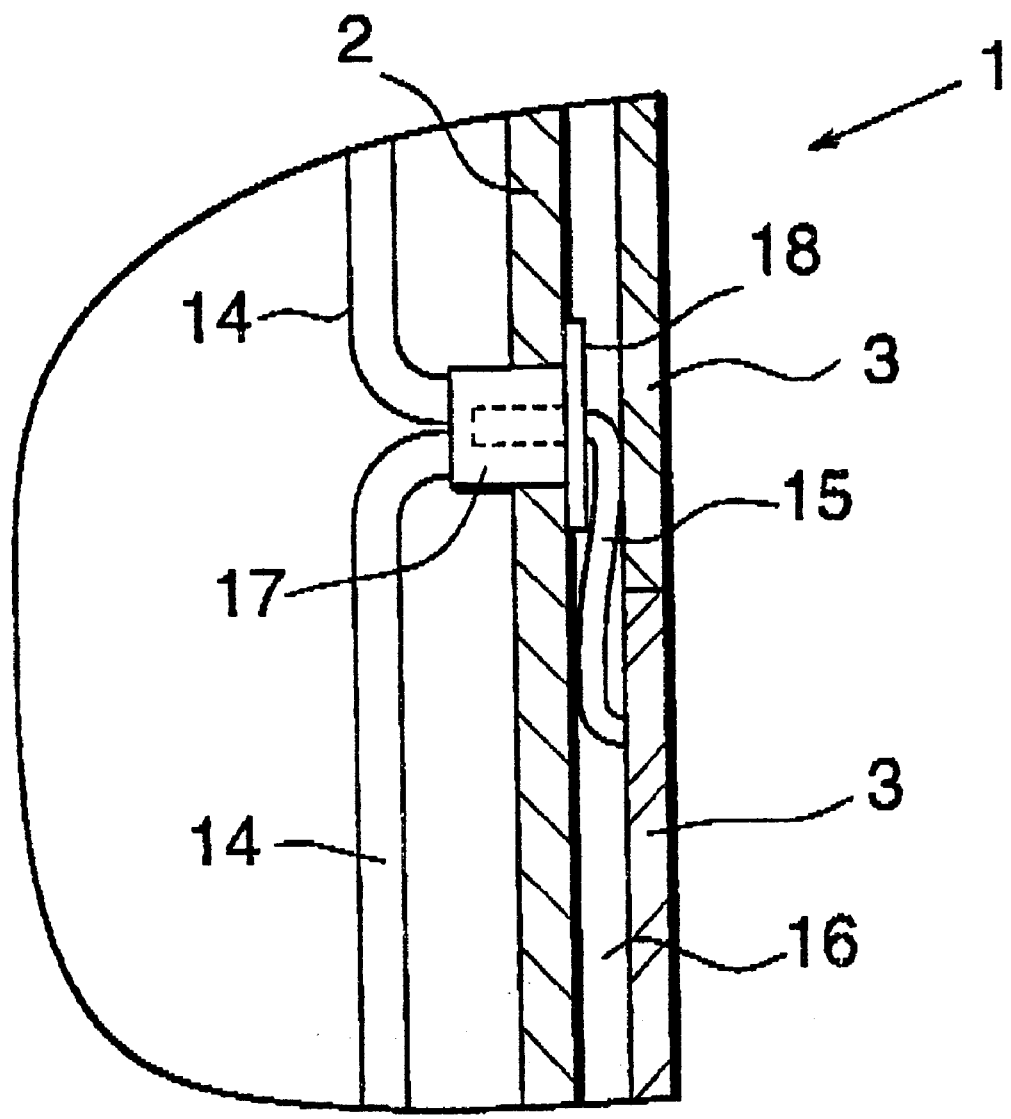
FIG. 4 is an enlarged fragmentary view in vertical section of the same.

As shown in detail in FIGS. 2 and 4, the pole main body 2 has internal wiring 14 for supplying therethrough the electric energy from the storage device 4 to the lighting device 5A as an electric device. Each solar cell module 3 has a positive-side wire 5 and a negative-side wire 5 which are connected to the internal wiring 14 by female and male connectors 17, 18 and which are thereby attached to the side wall of the main body 2. The wires 5 between the adjacent modules 3 are accommodated in a space portion 16 between the peripheral wall of the main body 2 and the modules 3.

The pole 1 having solar cells and embodying the invention is of all-weather design, operable on rainy or cloudy days or in the shade on clear days, and so adapted to charge and discharge electric energy to the storage device in the amount to be used for one day.

Stated more specifically, the arrangement of solar cell modules 3 has the function of generating the electric energy to be consumed by the lighting device 5A for one day, and the storage device 4 has a capacity to accumulate the electric energy to be consumed by the lighting device 5A for one day.

The arrangement of solar cell modules 3 further has the function of generating the electric energy to be consumed by the lighting device 5A for the day, with a quantity of solar radiation afforded by at least scattered sunlight selected from scattered sunlight or direct sunlight. Thus, the electric energy to be generated by the arrangement of solar cell modules 3 is predetermined based on the quantity of solar radiation available on a rainy or cloudy day.

The solar radiation due to scattered sunlight has a unique nature and is available during sunshine from morning till evening. It is radiant energy available evenly for a long period of time during the daytime regardless of the weather even on a rainy or cloudy day or in the shade on a clear day, and irrespective of whether the solar cell system faces east, west, south or north, i.e., regardless of the orientation of the system installed. Accordingly the solar cell-incorporating pole 1 of the invention is of all-weather design and operable under rainy or cloudy weather or in the shade on clear days.

According to the present invention, the solar cell modules 3 are arranged generally vertically on the peripheral wall of the pole main body 2, so that the generated output of the modules 3 is about ¼ of the original rated generated output of the modules 3. Since the generated output is based on the quantity of solar radiation afforded by scattered sunlight on the rainy or cloudy day as stated above, the generated output to be utilized consequently corresponds to several percent of the original rated generated output of the modules 3.

The surface area of the solar cell module 3 in the form of a panel and the number of solar cell modules 3 to be used are therefore suitably determined in accordance with the amount of electric energy to be obtained by the pole 1.

Table 1 below shows the relationship between the surface area and generated output of one module 3 and the amount of electric energy to be obtained by the module. The values in the parentheses are the amounts of electric energy to be obtained by the modules 3 in one stage.

TABLE 1

| Surface area | Generated output | Electric energy |
| --- | --- | --- |
| a 150 mm × 814 mm | 11 W/h | 4.5 W/h (18 W/h) |
| b 250 mm × 814 mm | 23 W/h | 9.0 W/h (36 W/h) |

Suppose the pole 1 of the invention is to be used as a street lamp pole, for example, with an electrodeless xenon fluorescent lamp serving as the lighting device 5A. When the fluorescent lamp consumes electric energy at a rate of 7W/h and is operated for 5 hours, the quantity of electric energy consumed is 35 W/h. Solar cell modules 3 of the type b in Table 1 are therefore suitable to use in this case.

Thus, the surface area of the module 3, the number of modules to be used, the generated output and the amount of electric energy to be obtained are most suitably determined in view of the height, thickness and cross sectional shape of the pole main body 2.

Figure 5:
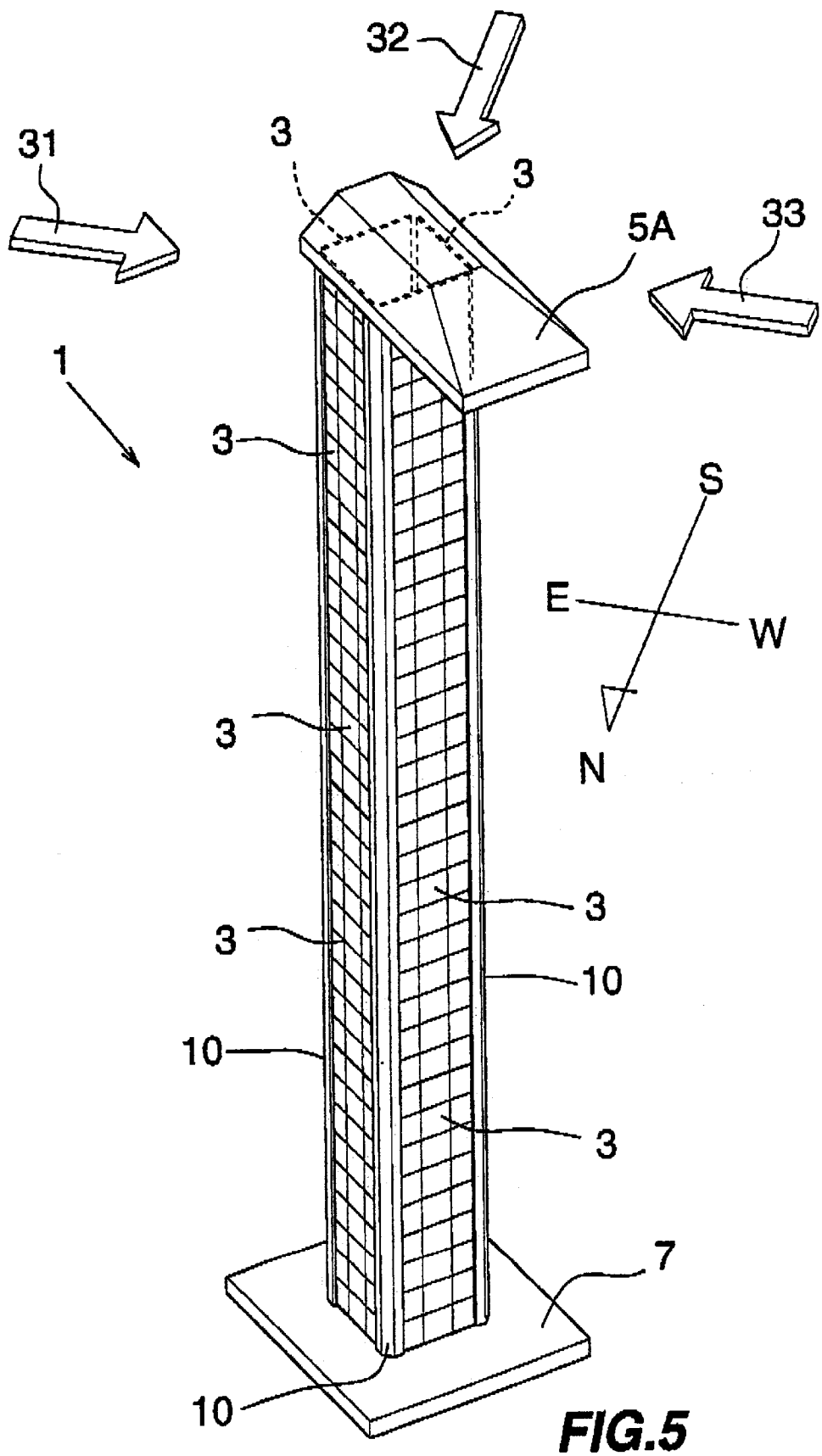
FIG. 5 is a schematic perspective view showing the position of the pole for use as a street lamp relative to sunlight.

According to the present embodiment, the solar cell modules 3 are arranged over the entire area of peripheral wall of the pole main body 2 having a square cross section, so that the module arrangement is exposed to solar rays including solar rays 32 from the south during culmination at noon, solar rays 31 from the east in the morning and solar rays 33 from the west in the afternoon as shown in FIG. 5. As a result, sunshine during the daytime can be effectively utilized to obtain solar energy efficiently.

In the illustrated case, it is desirable to position the pole 1 so that one corner thereof faces toward the direction of culmination of the sun.

Figure 6:
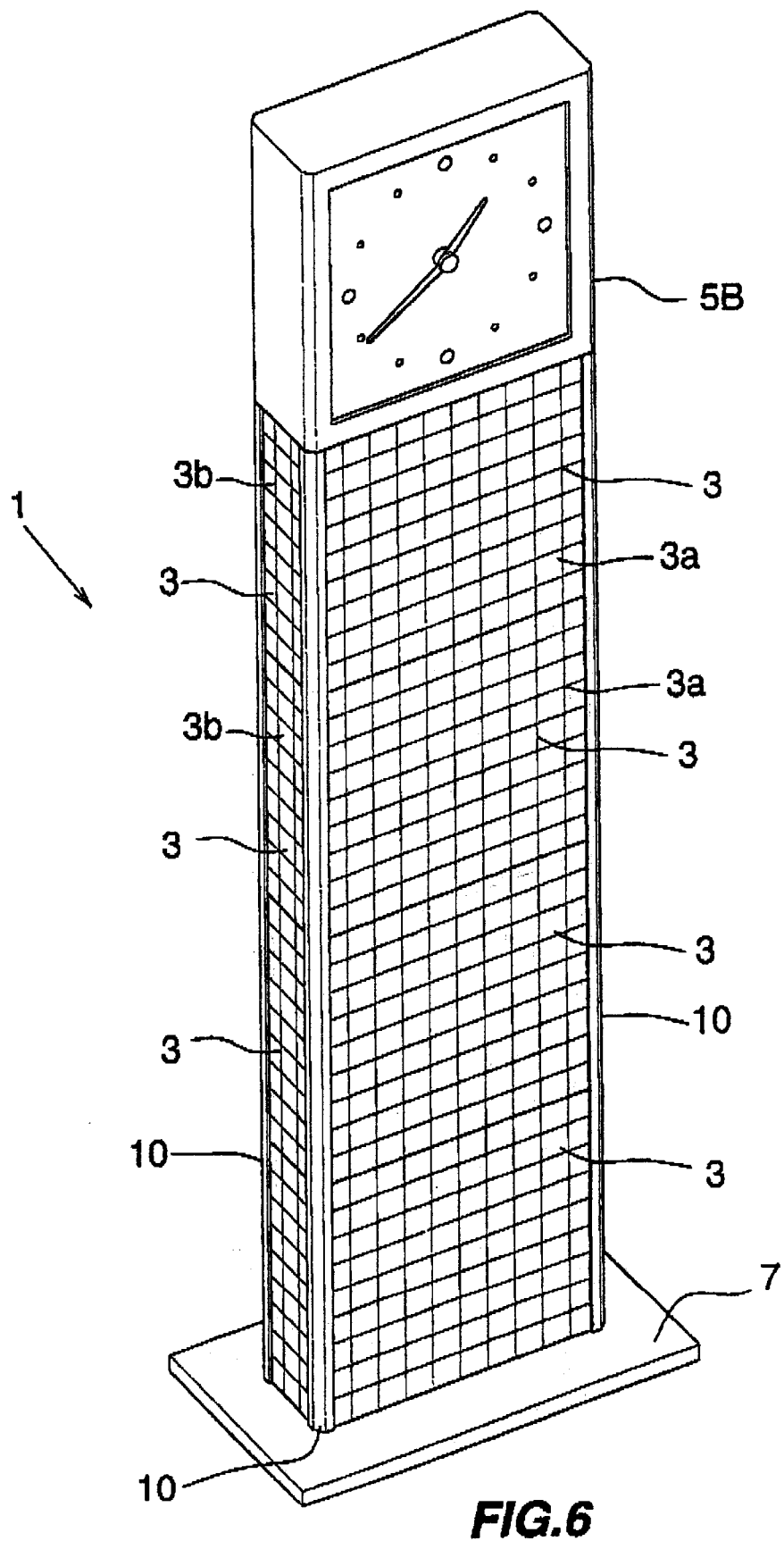
FIG. 6 is a schematic side elevation showing a second embodiment of the invention, i.e., a pole having solar cells and useful as a pole having an electric clock.
Figure 7:
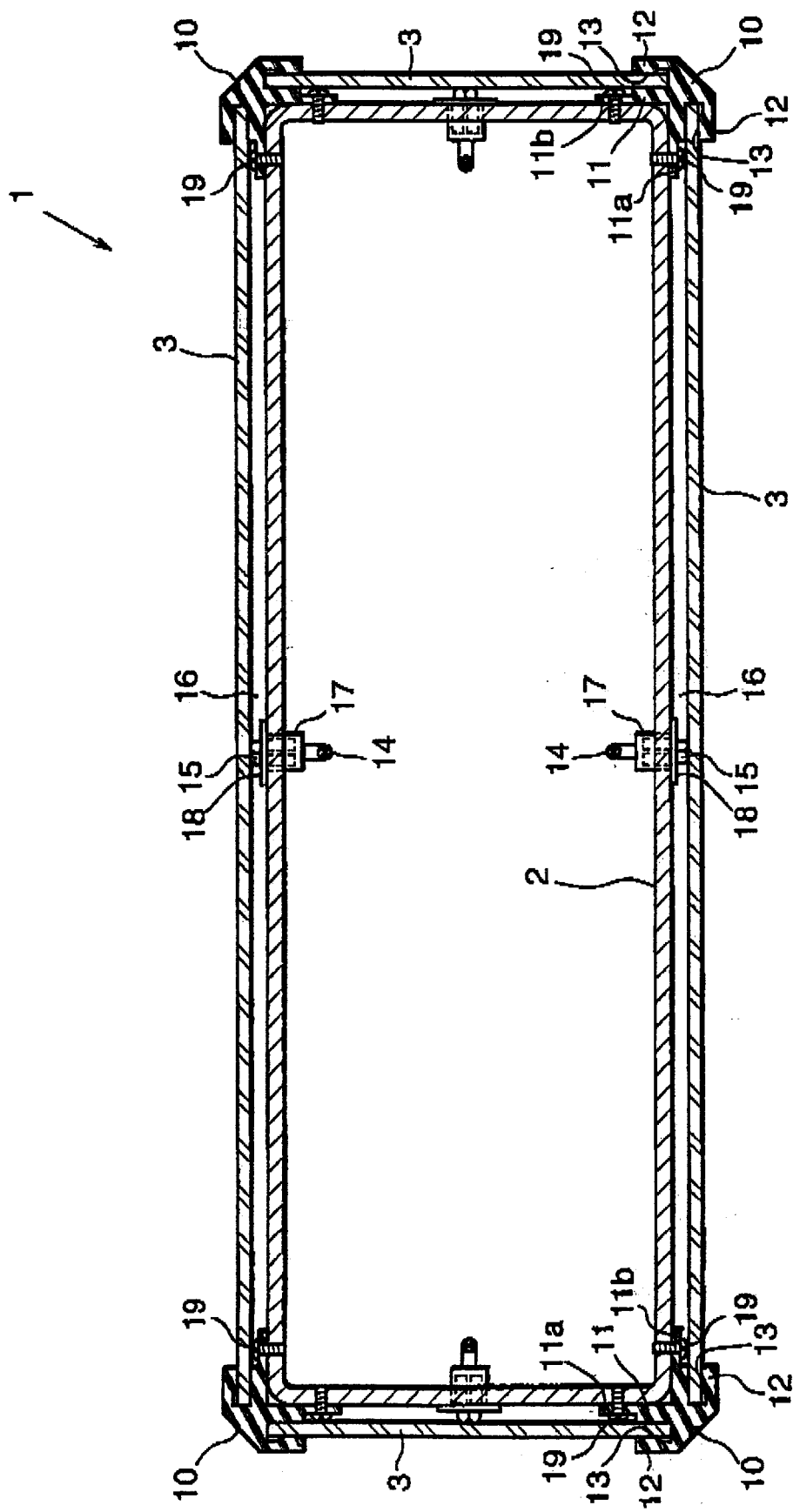
FIG. 7 is an enlarged view in horizontal section of the same.

FIGS. 6 and 7 show a second embodiment of the invention, i.e., a solar cell-incorporating pole 1 having an electric clock 5B serving as an electric device and mounted on the top end of the pole 1. The main body 2 of the pole is rectangular in cross section. Accordingly, solar cell modules 3a of large width are attached to the side of the pole main body 2 having a large width, and solar cell modules 3b of small width are attached to the body side of small width. The modules 3 are arranged one above another in four stages.

The second embodiment has the same construction as the first with the exception of the above feature.

Figure 8:
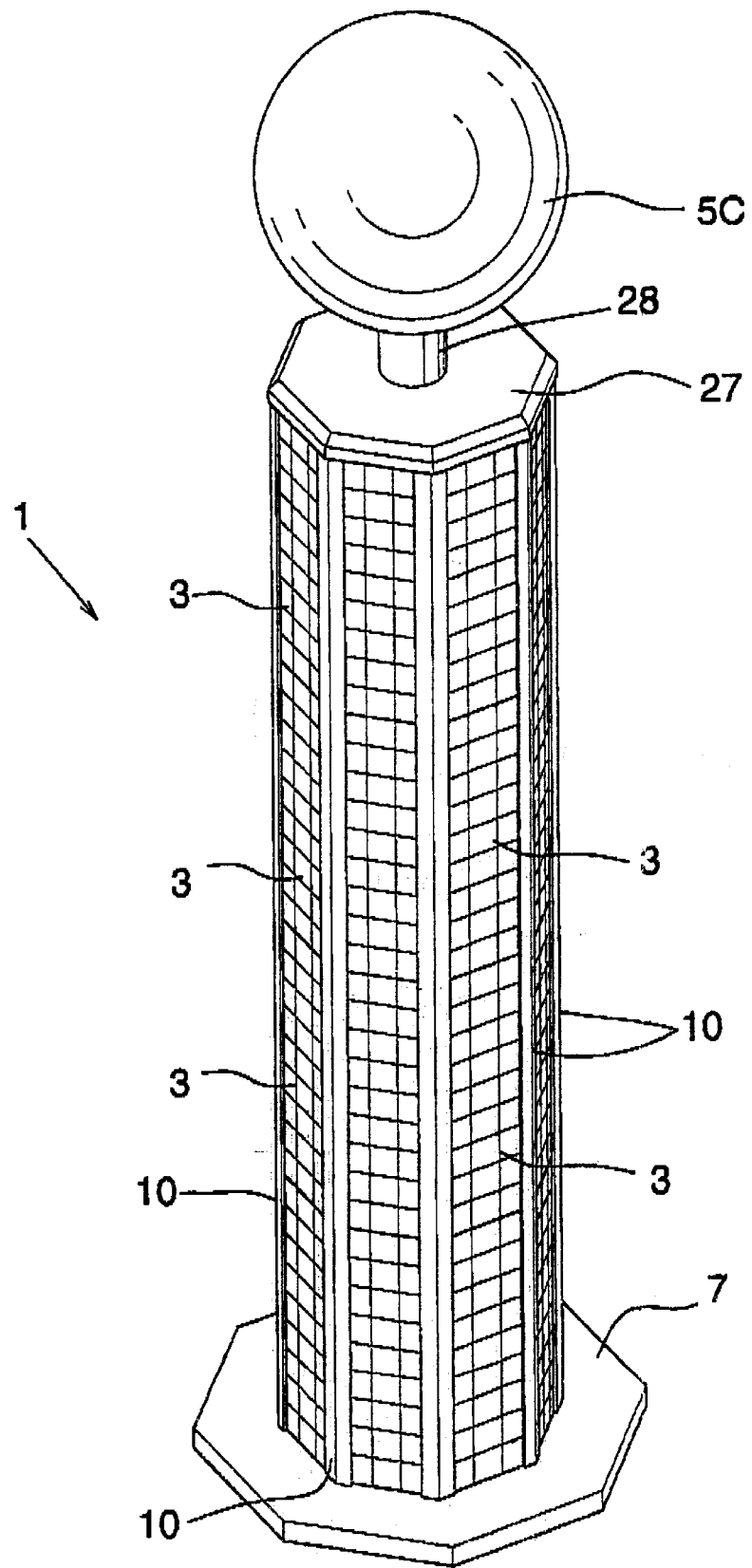
FIG. 8 is a schematic side elevation showing a third embodiment of the invention, i.e., a pole having solar cells and useful as a street lamp having a circular lighting device.
Figure 9:
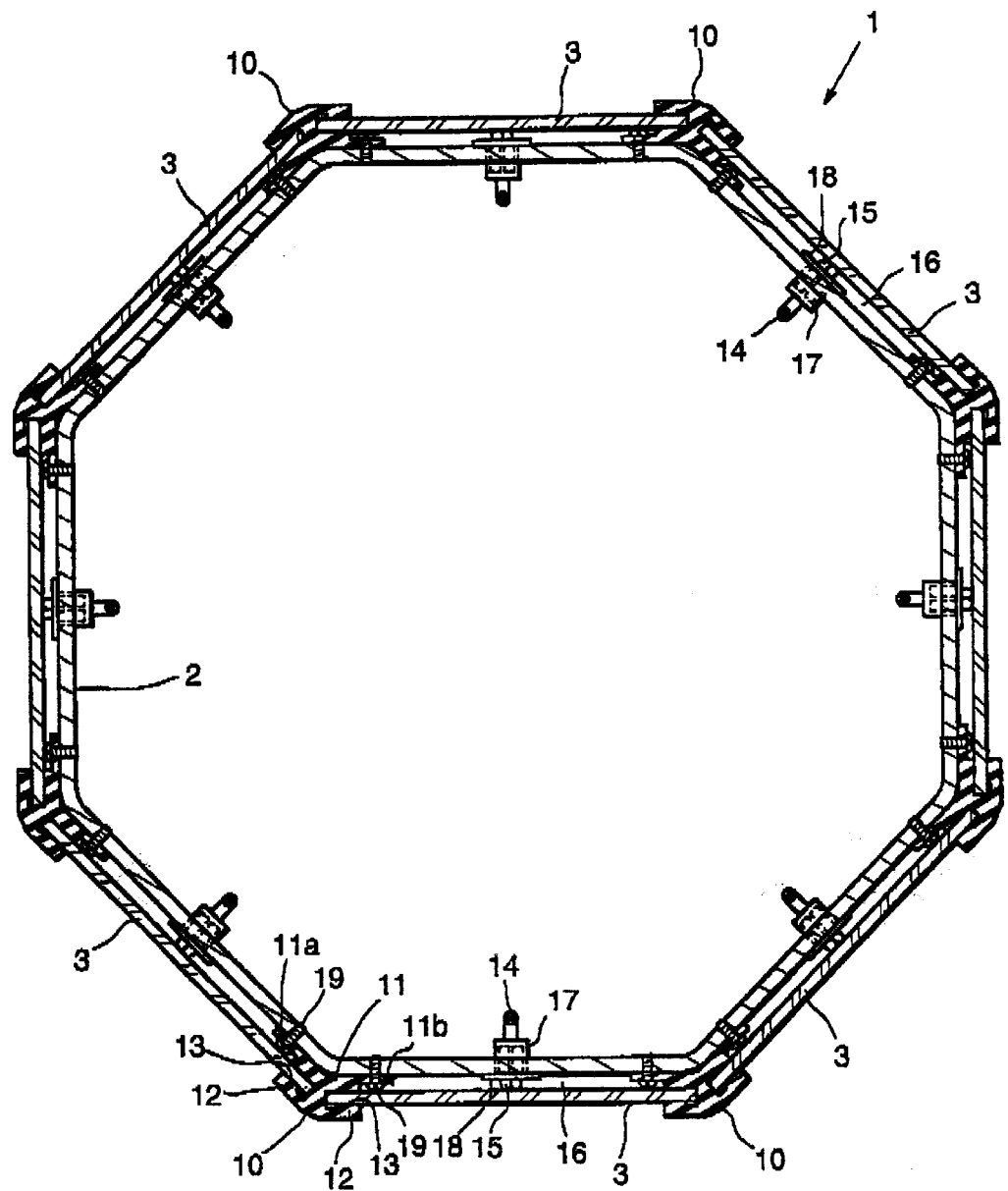
FIG. 9 is an enlarged view in horizontal section of the same.

FIGS. 8 and 9 show a third embodiment of the invention, i.e., a solar cell-incorporating pole 1 which has a street lamp circular lighting device 5C serving as an electric device and supported by a cylindrical bracket 28 on the top wall 27 of the pole 1. The pole comprises a main body 2 which has a regular octagonal cross section.

The third embodiment differs from the first in that corner members 10 serving as means for holding solar cell modules 3 have an angled cross section corresponding to one corner of a regular octagon. With the exception of the above feature, the third embodiment has exactly the same construction as the first.

Figure 10:
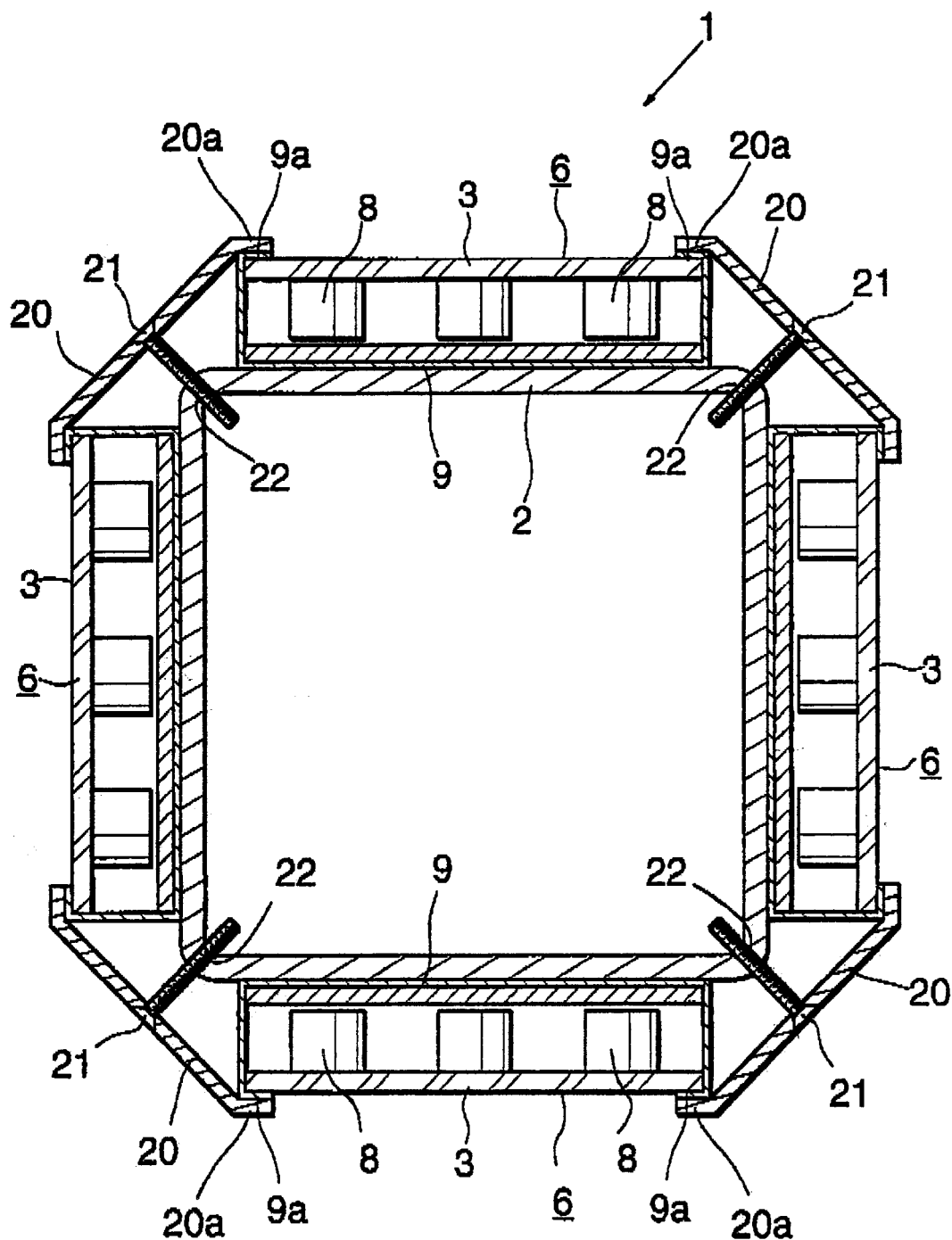
FIG. 10 is an enlarged view in horizontal section and showing a fourth embodiment of the invention, i.e., a pole having solar calls and useful as a street lamp.
Figure 11:
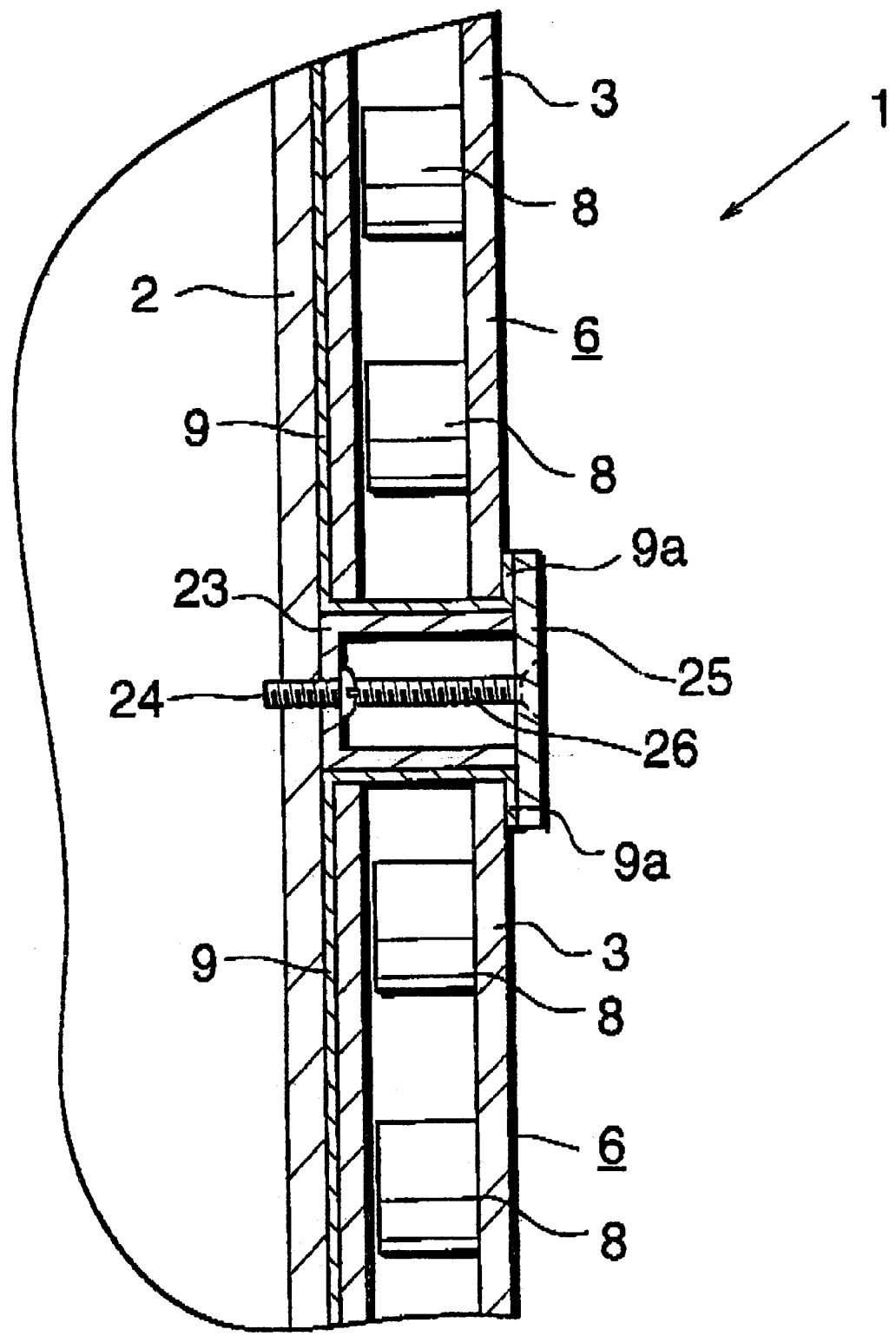
FIG. 11 is an enlarged fragmentary view in vertical section of the same.
Figure 12:
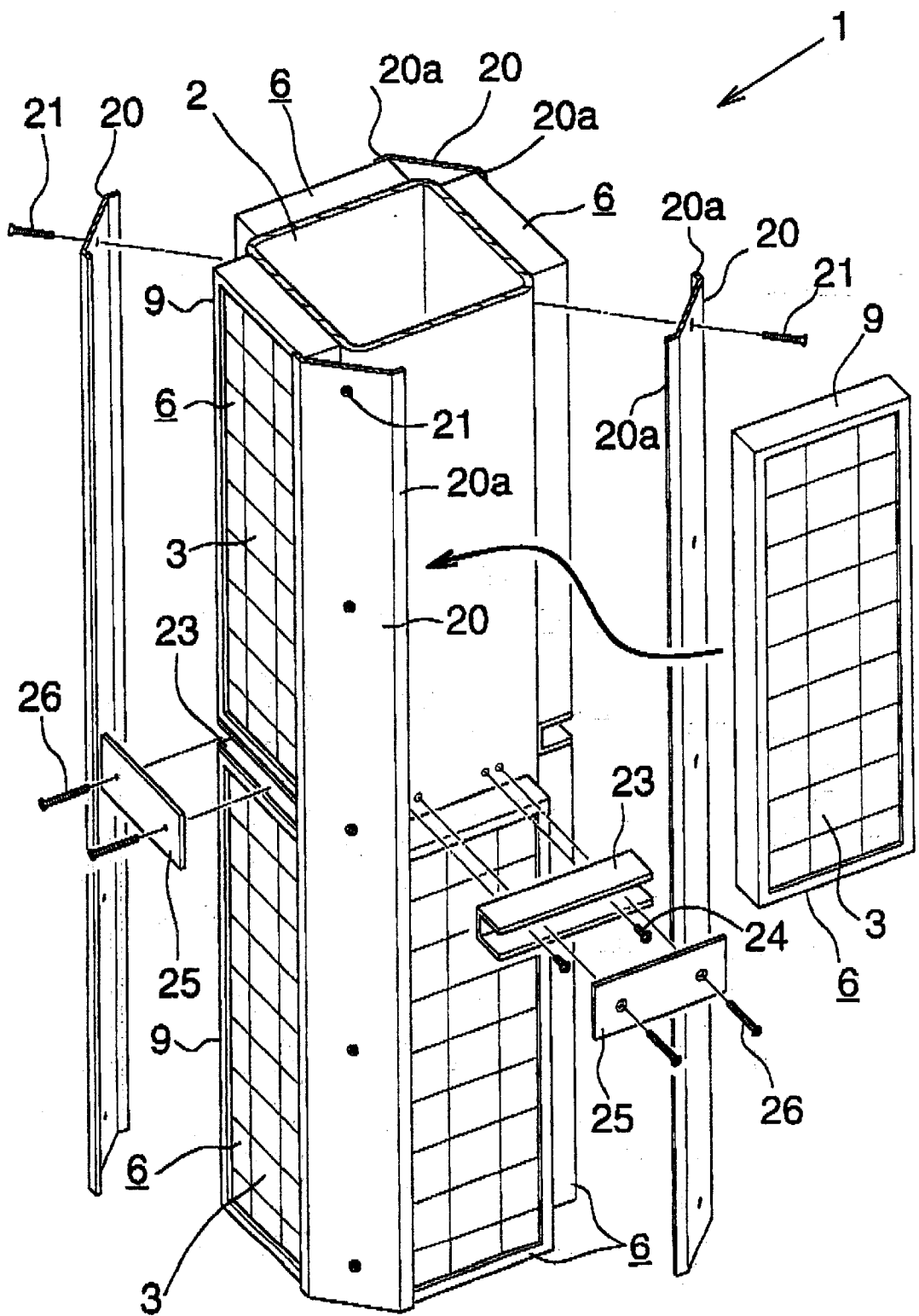
FIG. 12 is an enlarged fragmentary perspective view of the same to show solar cell modules as attached to the peripheral wall of the main body of the pole.

FIGS. 10 to 12 show a fourth embodiment, which includes power source units 6 each comprising a solar cell module 3 and electric double layer capacitors 8 serving as storage devices, provided on one side of the module 3 and housed in a casing 9. The power source units 6 are attached approximately vertically to the peripheral wall of a pole main body 2 having a square cross section so as to extend along the wall, with the capacitor side of each unit facing the main body.

The power source units 6 are fastened to the pole main body 2, for example, by corner members 20 made of extruded aluminum material and attached to the four corners of the main body 2. More specifically, each corner member 20 has opposite side edge portions 20a for holding inwardly projecting edge portions 9a of the casings 9 of two adjacent units 6. Screws 21 are inserted through the corner member 20 at its widthwise midportion and have their inner ends screwed into threaded holes 22 in the corresponding corner of the pole main body 2. In this way, the power source units 6 are held in place by the corner members 20.

A spacer 23 channel-shaped in cross section and having an outwardly facing opening is interposed between each pair of power source units 6, 6 which are vertically adjacent to each other, and has a bottom wall attached to the pole main body 2 with screws 24. The opening of the spacer 23 is covered with a holding plate 25 for holding the lower end of the casing 9 of the upper unit 6 and the upper end of the casing 9 of the lower unit 6. The holding plate 25 is fastened to the side wall of the pole main body 2 with long screws 26 along with the spacer 23.

Figure 13:
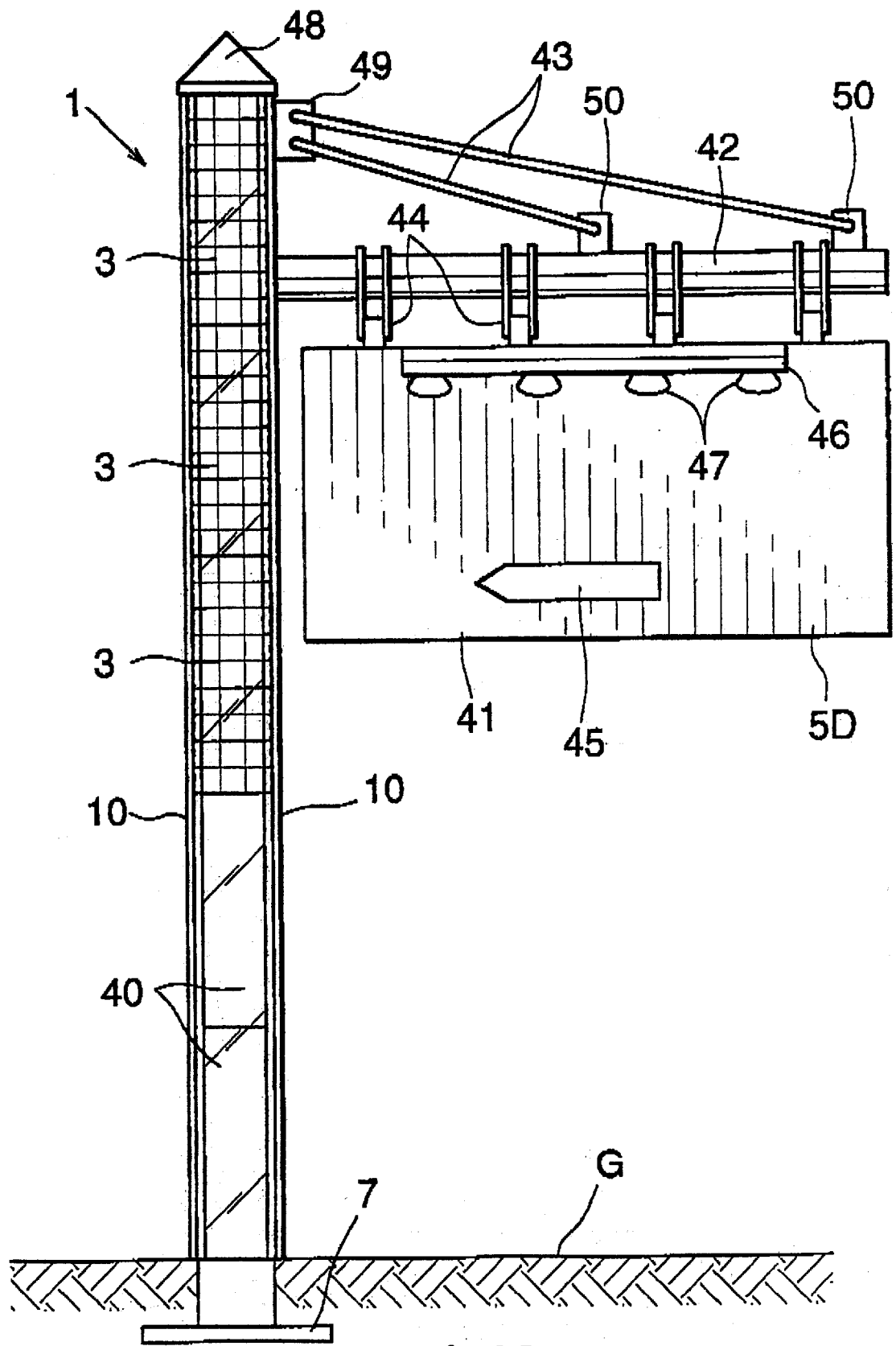
FIG. 13 is a front view showing a fifth embodiment of the invention, i.e., a pole having solar cells and useful as a pole having a public sign having illuminating means.
Figure 14:
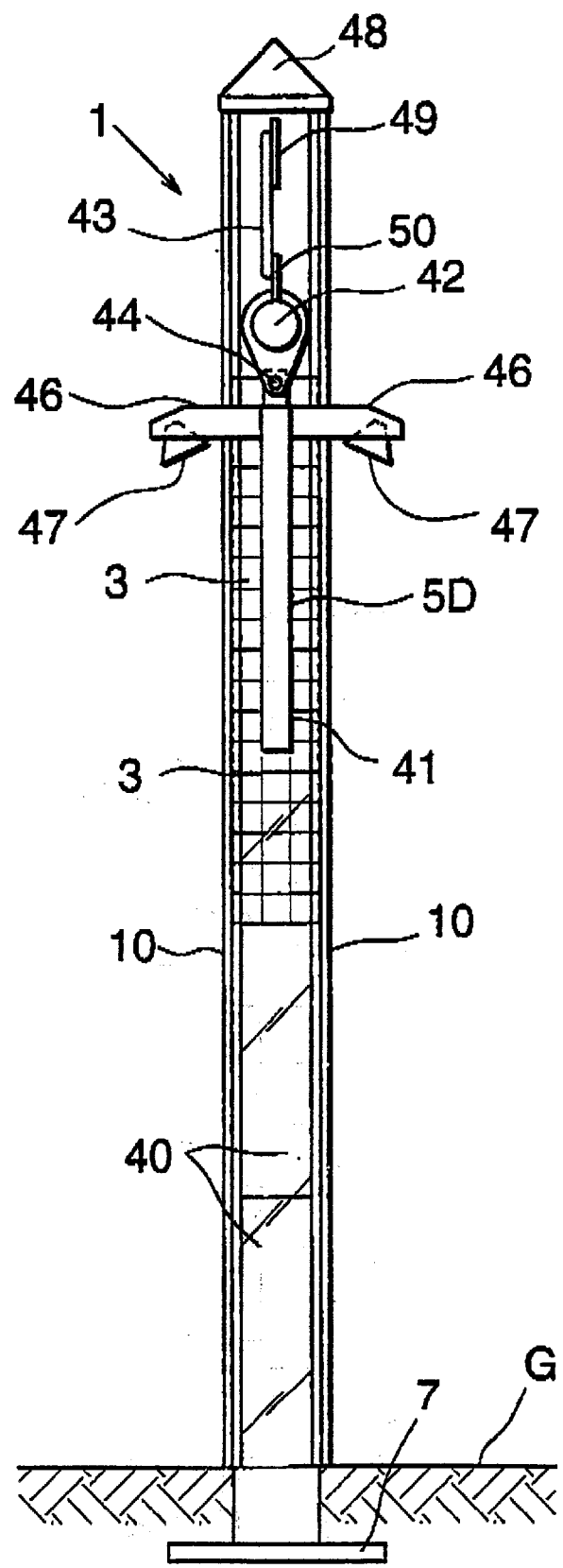
FIG. 14 is a right side elevation of the same.

FIGS. 13 and 14 show a fifth embodiment, i.e., a solar cell-incorporating pole 1 which is provided with a public sign 5D as an electric device.

The pole 1 of the fifth embodiment comprises a main body 2 which is the same as the pole main body 2 of the first embodiment. More specifically, the main body 2 is square in cross section, extends upright from a base 7 on the ground G and has panellike solar cell modules 3, which are attached to the peripheral wall of the body 2 approximately vertically.

The modules 3 are arranged in three stages on the upper half of the pole main body 2. Panels 40 which are not solar cell modules but have approximately the same size as the module 3 are attached in two stages to the lower half of the main body 2. These panels 40 give a neat appearance to the peripheral wall of the pole 1 and permit the arrangement of modules 3 to be positioned at a level higher than the ground G by two stages of panels 40, so that the modules 3 can be protected from mischief or damage.

The public sign 5D comprises a signboard 41 suspended by four hangers 44 from an arm 42 projecting horizontally from an upper end portion of the pole main body 2. The arm 42 is supported by long and short two wires 43 connected between a bracket 49 at the upper end portion of the main body 2 and two brackets 50 disposed respectively at the outer end and an intermediate portion of the arm 42. A cap 48 in the form of a triangular pyramid is provided at the upper end of the main body 2.

The signboard 41 bears characters, symbol or pasigraphy, which is illuminated by a lighting device 46 comprising electrodeless xenon fluorescent lamps 47 or usual fluorescent lamps. The signboard 41 further bears a guide sign 45 in the form of an arrow which itself is caused to luminesce as by light-emitting diodes. The electric energy provided by the solar cell modules 3 and accumulated in the storage devices 4 is supplied to these devices 47, 45.

What is claimed is:

1. A pole having solar cells, wherein the pole has an electric device attached thereto, comprising:

a plurality of solar cell modules arranged approximately vertically on at least one portion of a peripheral wall of the pole main body, the pole main body being provided with a storage device for accumulating therein electric energy from the solar cell modules so as to supply electric energy accumulated in the storage device to the electric device, wherein the plurality of solar cell modules includes a number sufficient to generate an amount of electric energy to be consumed by the electric device for one day, and the storage device has a capacity to accumulate the amount of electric energy generated by the plurality of solar cell modules to be consumed by the electric device for one day.

2. The pole having solar cells according to claim 1, wherein the plurality of solar cell modules generate electric energy from received solar radiation afforded by at least sunlight selected from scattered sunlight or direct sunlight.

3. The pole having solar cells according to claim 1 wherein the storage device is a device selected from the group consisting of electric double layer capacitor, nickel-cadmium battery and lead battery, and wherein the pole main body is hollow and the storage device is provided inside the hollow pole main body.

4. The pole having solar cells according to claim 1 wherein the pole main body is polygonal in cross section, and the solar cell modules are attached to and extend along at least one of the sides of the pole main body.

5. The pole having solar cells according to claim 1, wherein said electric device produces light energy.

* * * * *